UNITED STATES PATENT OFFICE.

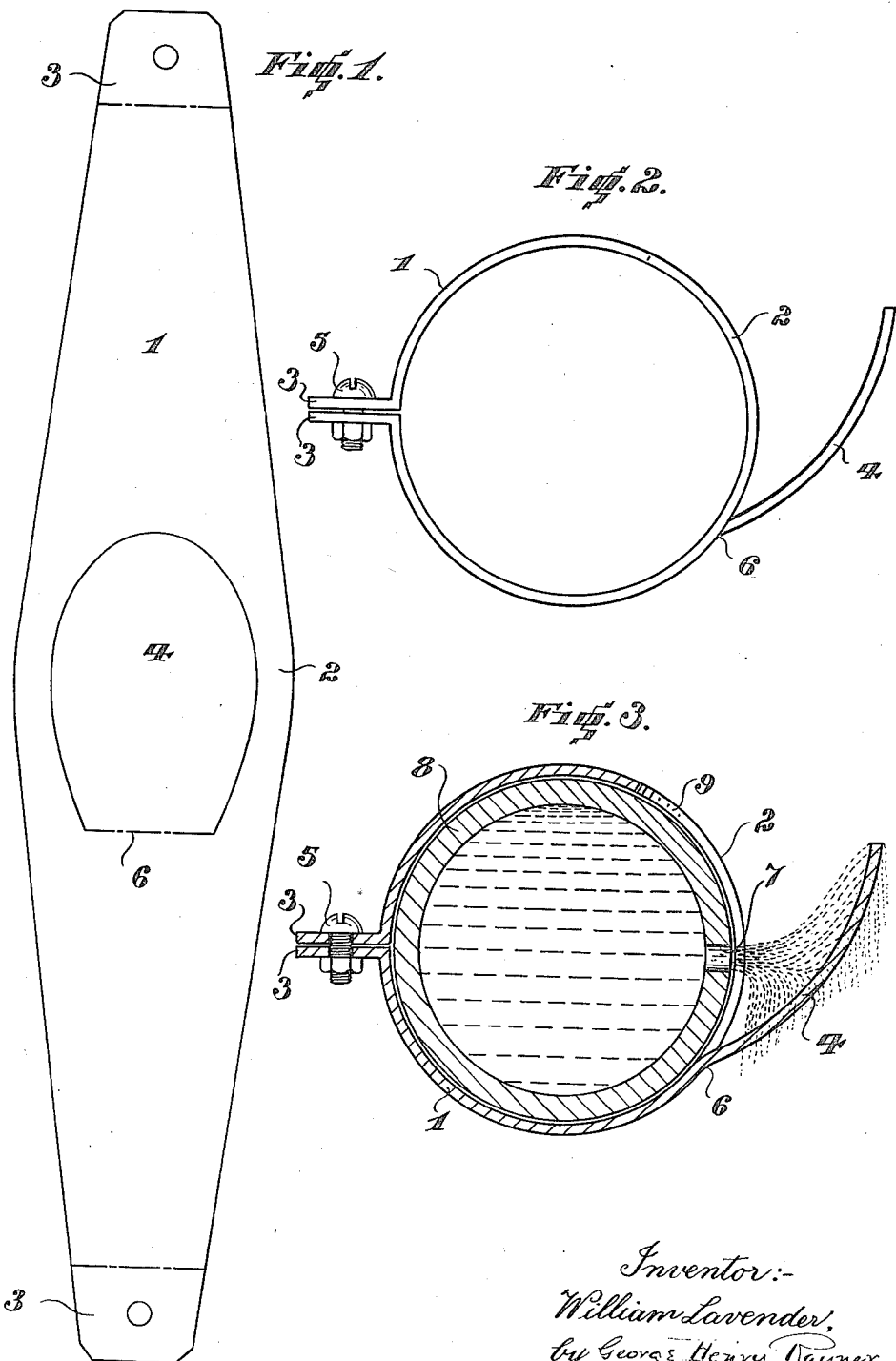

WILLIAM LAVENDER, OF PINNER, ENGLAND.

SEWAGE-DISTRIBUTER FOR FILTER-BEDS.

1,177,192.  Specification of Letters Patent.  Patented Mar. 28, 1916.

Application filed April 26, 1915. Serial No. 24,129.

*To all whom it may concern:*

Be it known that I, WILLIAM LAVENDER, subject of the King of Great Britain and Ireland, residing at Cannons Lane, Pinner, in the county of Middlesex, England, have invented certain new and useful Improvements in Sewage-Distributers for Filter-Beds, of which the following is a specification.

My invention relates to an improved form of screen or baffle adapted to lie secured in position over an aperture in the pipes of sewage distributers for filter beds.

According to my invention I employ a strip of sheet metal bent into substantially circular form and provided with turned out and pierced ends adapted to receive a bolt or screw for clamping same around the pipe. From the body of this metal strip is cut a tongue which is pressed out of it and bent into an upwardly curved form so as to screen a hole in the pipe over which the strip is secured. In this way any fluid issuing from the aperture in the pipe strikes upon the tongue and is spread out and discharged over its edges, whereby a maximum distributing effect is obtained at each discharge aperture owing to the large distributing edge offered by the periphery of the curved tongue. One of these screens or baffles is clamped over each aperture in the pipe or series of pipes of a sewage distributer and this effects in a simple manner a much more efficient distribution and aeration of the matter to be treated. These screens or baffles are both cheap and simple to construct, and may be readily fitted to existing distributers without any alteration thereof, and should any become damaged or worn out they may be readily replaced without interfering with the others.

In order that my invention may be more readily understood, reference is had to the accompanying drawings in which:—

Figure 1 is a plan showing the flat blank from which the screen or baffle is bent to shape. Fig. 2 is an end view showing the baffle complete and ready for securing in position and Fig. 3 is a cross section showing the device fitted to a pipe or arm of the distributer.

Referring to the drawings, 1 is the sheet metal blank having a maximum width at or near its center 2 and tapering off toward the two ends 3. The tongue 4 is cut or punched out of the blank 1 at or near the widest portion 2. The main portion of the blank is bent into circular form as shown in Figs. 2 and 3 so as to act as a clip adapted to be secured upon a pipe or the like by means of the screw and nut 5 which clamps the pierced ends 3. The tongue 4 is bent upward from the blank 1 at 6 and curved so as to screen the aperture 7 in the pipe 8 so as to insure that all the fluid issuing from the pipe shall impinge upon the tongue 4 utilizing a maximum of operative distributing edge of the tongue 4. The aperture 9 in the blank 1 from which the tongue 4 is punched or pressed outward, allows the device to be secured over the hole 7 in the pipe 8 without obstructing same.

What I claim as my invention and desire to secure by Letters Patent is:—

In a sewage distributer for filter-beds a band or strip bent so as to embrace the distributer arm, means to clamp the ends of this strip together so as to secure it on the said distributer arm, an aperture in the strip or band, a tongue formed integral with the said strip or band by the portion punched out to form the aperture therein, which portion is cut away on three sides but remains attached on the fourth, the tongue being bent upwardly and outwardly so as to intercept the stream of liquid issuing from the discharge aperture in the distributer arm.

In witness whereof I have hereunto set my hand.

WILLIAM LAVENDER.

Witnesses:
 FRANK WILLIAM PATTISON,
 COLIN DOUGLAS McCREDDIE.